(12) United States Patent
Hellwig et al.

(10) Patent No.: US 6,364,678 B1
(45) Date of Patent: Apr. 2, 2002

(54) POWER COLUMN

(75) Inventors: John Hellwig, Toronto; Steve Verbeek, Aurora; Paul Crossland, Brampton; Michael Sherrard, Toronto; Genadij Makarewicz, Brampton; Lorie Marangoni, Weston, all of (CA)

(73) Assignee: Teknion Furniture Systems Limited, Downsview (CA)

( * ) Notice: Subject to any disclaimer, the term of this patent is extended or adjusted under 35 U.S.C. 154(b) by 0 days.

(21) Appl. No.: 09/718,503

(22) Filed: Nov. 24, 2000

(51) Int. Cl.[7] ............................................. H01R 4/60
(52) U.S. Cl. ....................... 439/211; 439/210; 439/207
(58) Field of Search ............................... 439/211, 207, 439/210, 215

(56) References Cited

U.S. PATENT DOCUMENTS

| | | | | |
|---|---|---|---|---|
| 5,284,255 A | * | 2/1994 | Foster et al. ................. | 211/26 |
| 5,318,259 A | | 6/1994 | Fussler .................... | 248/188.8 |
| 5,794,392 A | | 8/1998 | Forslund, III et al. ..... | 52/220.7 |
| 5,913,783 A | | 6/1999 | Weener et al. ............. | 52/127.2 |

OTHER PUBLICATIONS

Brochure by Marshall Tufflex, East Sussex, England. Sterling Powerpoles and Posts—Bringing Services to Where You Really Want Them. No date.
Brochure by Mabeg—Ferdinand–Babriel–Weg 10, D–59494 Soest. No date.
Brochure by Voko—The Millennium Office. Printed by: FIWO 1st edition 01/99.
Brochure by Frontline Service Poles—Tailor–made & Pre–wired. Technical Information/Planning Guide 1999:03. Thorsman & Co. (U.K.) Ltd. No date.
Brochure by Oep Furniture Group PLC, Essex, England entitled: Meta—Data and Power Posts. No date.
Brochure by USG Interiors, Inc., Chicago Illinois entitled: Interior—The Freestanding Ceiling Tree. No date.
Brochure by Samas Roneo Ltd., England entitled: Dynamics. No date.
Brochure by REHAU Limited entitled: signo POL Power Poles & Posts. No date.
The Wiremold Company, West Stanford, CT, Williamstown, WV; Fergus, Ontario Canada, The Only Way to Wire . . . Quick Selection Guide: Tele–Power Poles. No date.
Wire Wizard, London, England. Ergonomic Workstations: Wire Wizard—Installation. No date.

* cited by examiner

Primary Examiner—Khiem Nguyen
Assistant Examiner—Chandrika Prasad
(74) Attorney, Agent, or Firm—Bereskin and Parr (57) ABSTRACT

A power column providing a conduit for power and communications wiring in a building includes a column structure having electrical power outlets and video data modules (VDMs) accessible on opposite flat end faces of the column structure. An isolated electrical raceway within the column structure includes the electrical outlets. The column structure is pre-wired electrically with wiring that extends through the raceway to the top end of the structure. Pre-wiring allows the column to be installed and then connected to an electrical supply after installation.

10 Claims, 6 Drawing Sheets

POWER COLUMN

FIELD OF THE INVENTION

This invention relates generally to so-called power poles or columns that are used in buildings as conduits for power and/or communications wiring.

BACKGROUND OF THE INVENTION

In modern office buildings, each floor typically is provided with a drop ceiling that is spaced below the slab of the floor above. Services such as power and communications cables are routed through the space between the finished ceiling and the floor slab. Provision must then be made to route cables or wires down to outlet points that are conveniently accessible from floor level.

In an office environment in which full height walls are used, the cables can of course travel down through the walls themselves. Where office partition systems are used that include panels of less than full height, it has been common practice for many years to install tubular conduits called "power poles" that extend vertically from the partition system to the ceiling, and through which appropriate wiring can be routed. Short free-standing columns or "posts" sometimes are used to bring power and/or communication wiring up from floor level to desk height.

Typically, a single power pole is used to provide power and/or communication services to a cluster of interconnected work stations or desks. Branch wiring is connected to a main feeder cable in the power pole and is routed to specific locations at which power and communications outlets are required.

SUMMARY OF THE INVENTION

An object of the present invention is to provide a power column having a number of features that represent improvements over the prior art.

The power column provided by the invention includes a column structure of elongate generally tubular form capable of being supported in a generally upright orientation on a floor surface. A plurality of electrical power outlets are carried by the column structure and are accessible from externally thereof. Electrical supply wiring extends from the outlets through the column structure to one end of the column for connection to an external electrical supply. The column structure defines an isolated electrical raceway that includes the electrical outlets and through which the electrical supply wiring extends to the said one end of the column structure. In other words, the electrical outlets are pre-wired and can be powered after installation of the column structure by connecting the electrical supply wiring within the column structure to the external electrical supply.

The fact that the receptacles are pre-wired means that the column can be delivered to site ready to be installed. All that is required is to physically position and secure the column in place, and for an electrician to connect supply wiring to the wiring from the electrical outlets. Installation is simplified and the need for on-site electricians is minimized, reducing the cost of installation.

In most applications, the column structure will be full height (floor to ceiling) and electrical supply wiring from the receptacles will extend to the top end of the column and be accessible within the ceiling space. However, the wiring could be connected at the bottom end of the column, for example, where a short column is used.

Preferably, the column structure includes a main tubular member which defines a lateral wall of the isolated raceway that surrounds the electrical supply wiring, and the tubular member is provided with at least two transverse partitions that are spaced longitudinally of the column and define end walls of the raceway.

The main tubular member of the column structure preferably has a generally rectangular cross-sectional shape defining opposite end walls that are flat and parallel to one another and that are exposed in the finished column structure. One or both of those flat end walls carries the electrical power outlets of the column and possibly video data modules (VDMs) that provide plug-in points for video and data connections. In other words, electrical power outlets and VDMs are accessible at opposite sides of the column.

Each of the flat end faces of the column structure preferably also includes attachment points for coupling to the column, accessories such as lights. These attachment points may be provided by a respective series of slots at opposite sides each end face into which can be engaged hook-shaped formations similar to the formations used on conventional shelf supports.

BRIEF DESCRIPTION OF THE DRAWINGS

In order that the invention may be more clearly understood, reference will now be made to the accompanying drawings which illustrate a particular preferred embodiment of the invention by way of example, and in which.

DESCRIPTION OF PREFERRED EMBODIMENT

Figure 1:
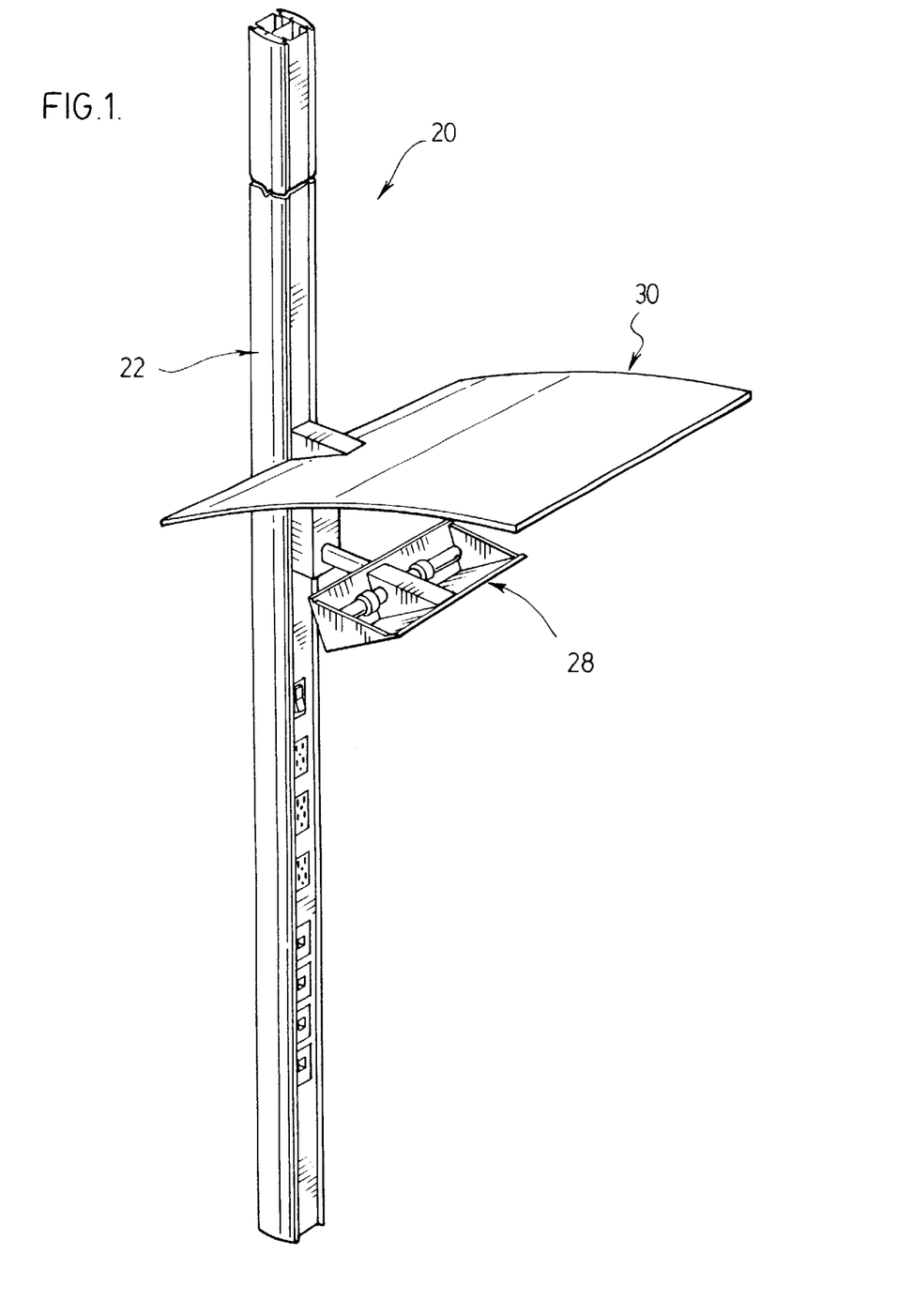
FIG. 1 is a three-quarter perspective view of one version of a power column according to the invention, in which the column includes a single light and associated reflector or "sail"
Figure 2:
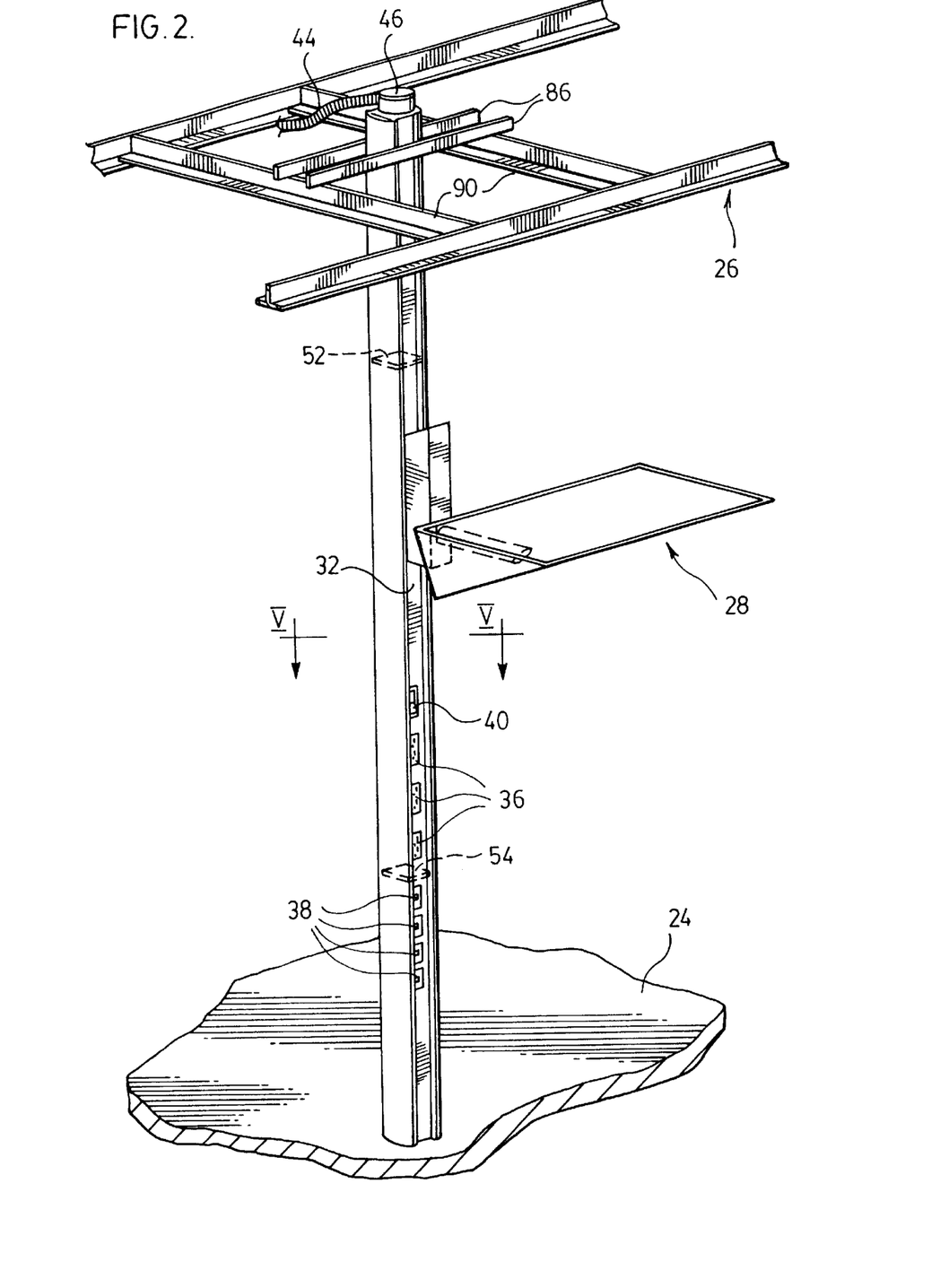
FIG. 2 is a view similar to FIG. 1, but showing more detail and in particular the manner in which the upper end of the column is coupled to the framework of a T-bar ceiling structure.

Referring first to FIGS. 1 and 2, a power column in accordance with the invention is generally indicated by reference numeral 20 and includes an elongate column structure 22 of tubular form that extends in a generally vertical orientation between a floor and a ceiling in a building. Parts of a floor and ceiling are shown at 24 and 26 respectively in FIG. 2.

As illustrated, the power column includes a single lamp or light 28 and a reflector or sail 30 that is disposed above the light. The light is designed to direct illumination upwardly and the sail has a concave lower surface that reflects downwardly, for example, onto a work surface or other area below the light. Other possible versions of the power column range from a plain column with no light or sail to a column that includes multiple lights and/or sails. The precise form of light used and the design and form of the reflector are not part of the invention and may vary. Other accessories such as work surfaces may be hung from the column structure 22. It should also be noted that the column need not be full height between a floor and ceiling but could be a post that extends up from the floor, for example, to desk height.

The cross-sectional shape and form of the column structure 22 is shown in detail in FIGS. 4 and 5, which will be described later. For the moment, it is sufficient to note that the column structure 22 has a generally rectangular configuration overall and includes two flat parallel faces 32 and 34 on which are mounted a series of electrical receptacles and voice/data modules (VDMs). In FIG. 2, three duplex electrical receptacles have been shown at 36 at positions spaced vertically along column face 32, above a similar series of VDMs 38. The precise number and arrangement of the receptacles and VDMs may vary according to design criteria. Receptacles and VDMs can be provided on only one or on both of the two flat faces 32 and 34 of the column. In the illustrated embodiment, an additional receptacle 36 is provided higher up on the column but concealed by the light 28. This receptacle is shown at 36' in FIG. 6 and provides a plug-in point for the light 28. Reverting to FIG. 2, a light switch 40 is located on face 32 above the series of receptacles 36 and controls receptacle 36'.

Figure 3:
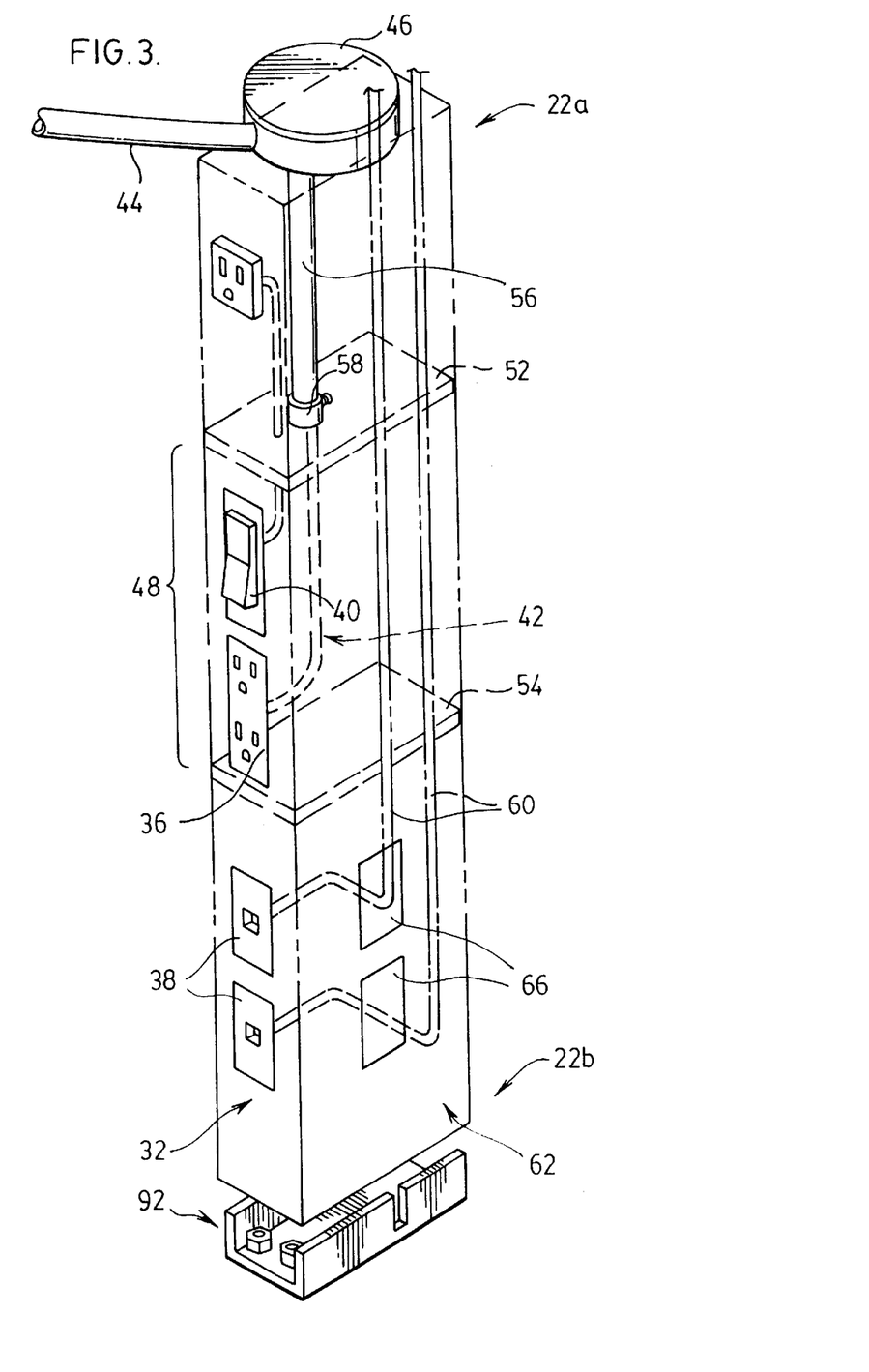
FIG. 3 is a somewhat diagrammatic view of the column and illustrates power and telecommunications cable connections to outlets on the column.

FIG. 3 diagrammatically illustrates a principal inventive feature of the power column.

For clarity of illustration, the column of FIG. 3 is shown rotated about a vertical axis through 90° from the orientation in which the column appears in FIGS. 1 and 2. Also, the column itself is shown in simplified form simply as a hollow tubular member. Further, FIG. 3 shows only two VDMs 38 and receptacles 36 (as well as receptacle 36').

Electrical supply wiring is indicated at 42 and extends from the receptacles 36 vertically up through the column 22 to the upper end of the column where the wiring is connected to an external electrical supply represented at 44, in an electrical outlet box 46. In an embodiment in which an external power supply is available at floor level, the wiring 42 could of course be routed down the column to its lower end 22b and, there, connected to the supply. A configuration such as this might be used, for example, where the column is less than full floor-to-ceiling height.

In any event, the column structure 22 defines an isolated electrical raceway 48 that includes the electrical receptacles 36 and through which the wiring 42 extends to the relevant end of the column structure. In the particular embodiment illustrated in the drawings, the raceway is defined laterally by a closed tubular member 50 which is shown in detail in FIGS. 4 and 5 and which defines the "core" or "spine" of the column structure 22. Top and bottom ends of the raceway are defined by upper and lower partitions 54 within the tubular member 50.

Above partition 52, the wiring 42 extends through a flexible protective outer sleeve (BX cable) 56 that is coupled to the partition 52 at a cable clamp 58 that also clamps the wiring 42 to provide strain protection (i.e. protection against the wiring 42 being pulled out of the receptacles 36). A similar cable clamp is provided where the wiring enters the box 46, but is not shown in FIG. 3. Power supply cables 44 that enter box 46 will be provided in accordance with applicable electrical codes, and typically will also be protected by an outer BX sleeve and a cable clamp.

Providing the power column with an isolated electrical raceway allows the column to be pre-wired with the appropriate number of electrical receptacles 36 and light switches (if any) in whatever configuration is appropriate for the intended use of the column. The column is delivered to the site ready to be installed and with the electrical wiring 42 accessible within outlet box 46. Once the column has been physically positioned and secured, all that is required is for an electrician to connect supply wiring to the wiring 42 within box 46. No on-site wiring of the column itself is required and there is no need (or indeed no possibility) that on-site personnel can have access to the wiring 42 inside the column. Generally speaking, pre-wiring simplifies installation and minimizes the need for on-site electricians, reducing the cost of installation.

FIG. 3 also illustrates the fact that the VDMs 38 are installed in the same flat face of the column structure 22 as the receptacles 36 (face 32) but outside the raceway 48. In the illustrated embodiment, the VDMs are below the lower partition 54 although they could of course be positioned above the upper partition 52.

In either case, communications wiring to the VDMs 38 is routed externally of the raceway 48 and therefore is electrically isolated from the wiring 42 to the receptacles 36. In FIG. 3, wires to the VDMs 38 are indicated at 60 and are routed down from the top end 22a of the column structure 22 externally of one of the two side walls of the tubular column member 50 that extends between the two exposed flat parallel walls 32, 34. In FIGS. 4 and 5, those walls are denoted respectively 62 and 64. As shown in FIG. 3, the cables extend down the column outwardly of wall 62 to respective locations below the lower partition 54, where the wires 60 pass into the interior of the column structure through openings 66 in wall 62. In the complete, assembled column structure, the wires 60 are enclosed within a cover member that provides an aesthetically pleasing appearance and configuration to the exterior of the column structure, outwardly of face 62. A similar cover is provided for the opposite face 64.

In practice, the column is manufactured with a predetermined number of openings or knock-outs corresponding to the openings 66 of FIG. 3. Similar openings or knock-outs are also provided to accommodate the receptacles 36 and VDMs 38. Appropriate blanking pieces or covers can be provided to close unused openings.

Figure 4:
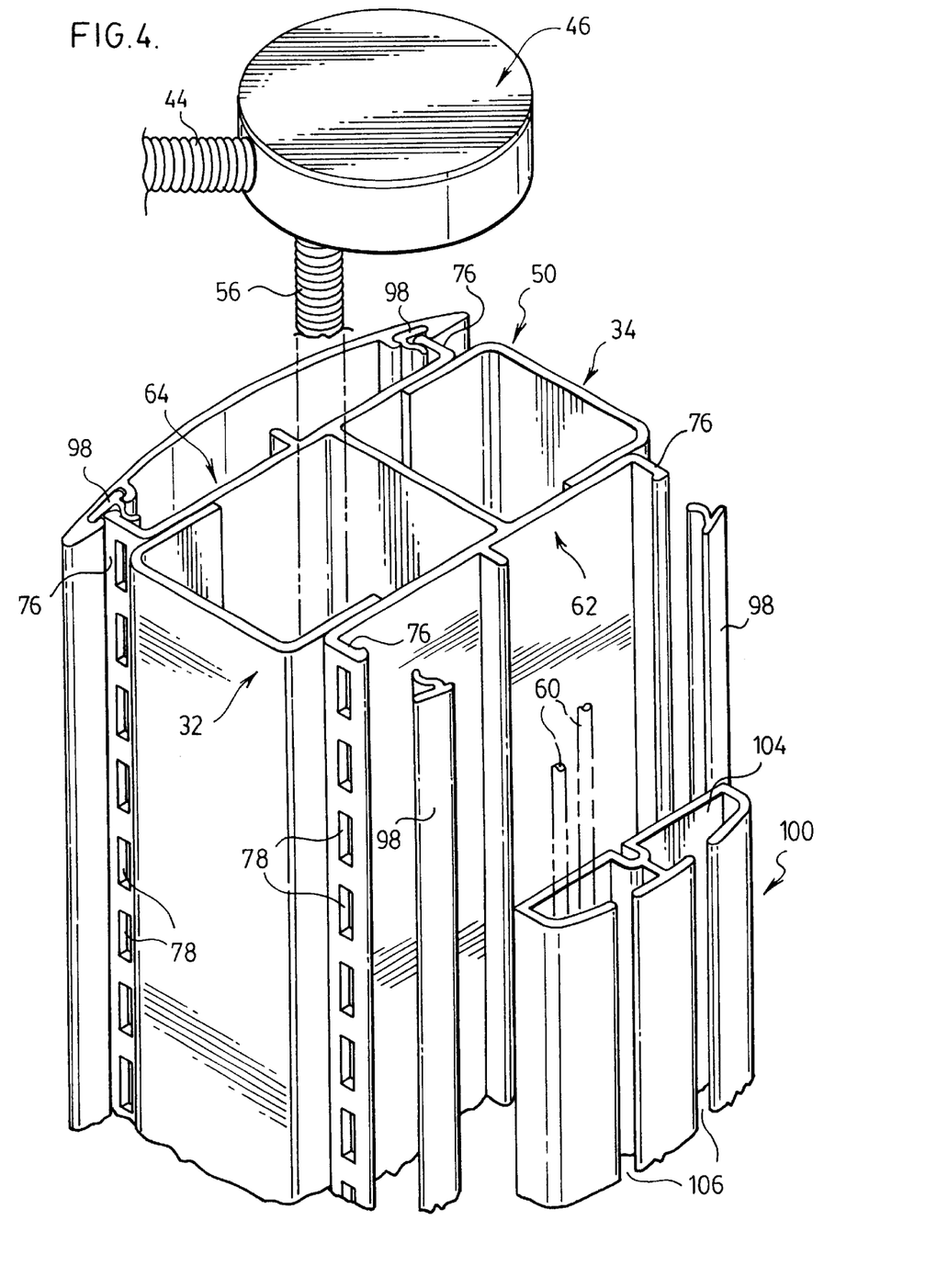
FIG. 4 is a detail perspective view that illustrates the construction of the column.
Figure 5:
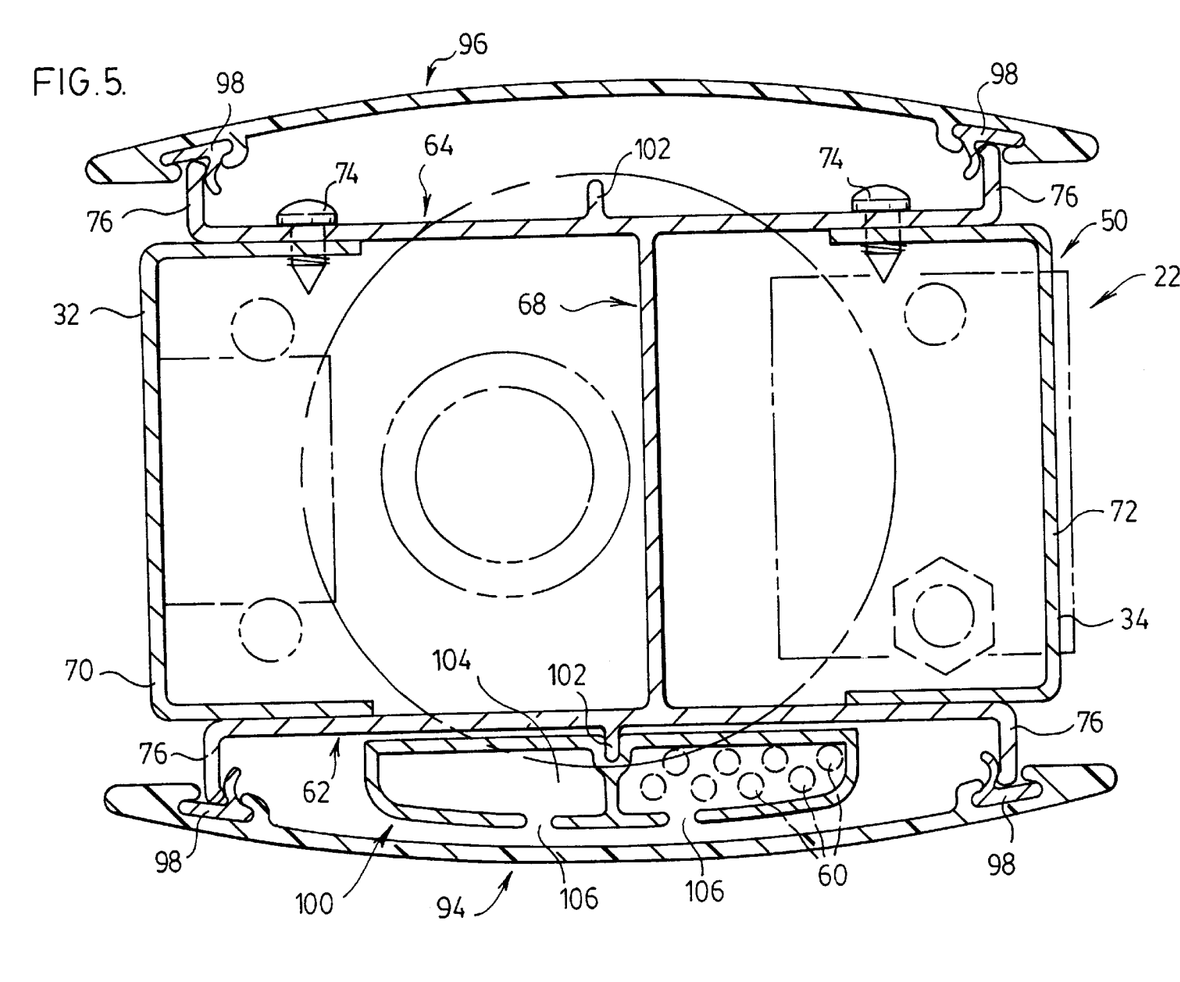
FIG. 5 is a horizontal sectional view generally on line V—V of FIG. 2.

Referring now to FIGS. 4 and 5, the closed tubular member 50 referred to previously that forms the core or spine of the column structure 22 is in fact an assembly of three steel extrusions, the cross-sectional shapes of which can clearly be seen in FIGS. 4 and 5. These extrusions comprise a main structural extrusion 68 that is generally H-shaped (shown turned through 90° in FIG. 5) and two channel section members 70, 72 that are secured to ends of the main extrusion 68 between the respective side limbs of the H so as to form a closed tube. As clearly seen in FIG. 5, the outer faces of the bases of the respective channels 70, 72 define the flat parallel faces 32, 34 of the column structure. The two extrusions 70, 72 are secured to the main extrusion 68 by metal screws, two of which are shown at 74 at the other side of extrusion of 68 only; similar screws are provided at the lower side of the extrusion but have not been shown.

Each of the partitions 52, 54 (FIGS. 2 and 3) is formed by a pair of angle brackets (not shown); one limb of each bracket is screwed to the central web of the main extrusion 68 and the other limb extends laterally from that web and fills the space between the web and the relevant channel (70 or 72).

Marginal portions of the side limbs of the H-shaped main extrusions 68 are turned outwardly to define respective pairs of flanges outwardly of and parallel to the flat end faces 32, 34 of the column structure. These flanges are individually denoted by reference numeral 76. As best seen in FIG. 4, each flange 76 is provided with a longitudinally extending series of narrow rectangular slots 78 and the slots of the respective flanges are aligned with one another transversely of the column structure.

Figure 6:
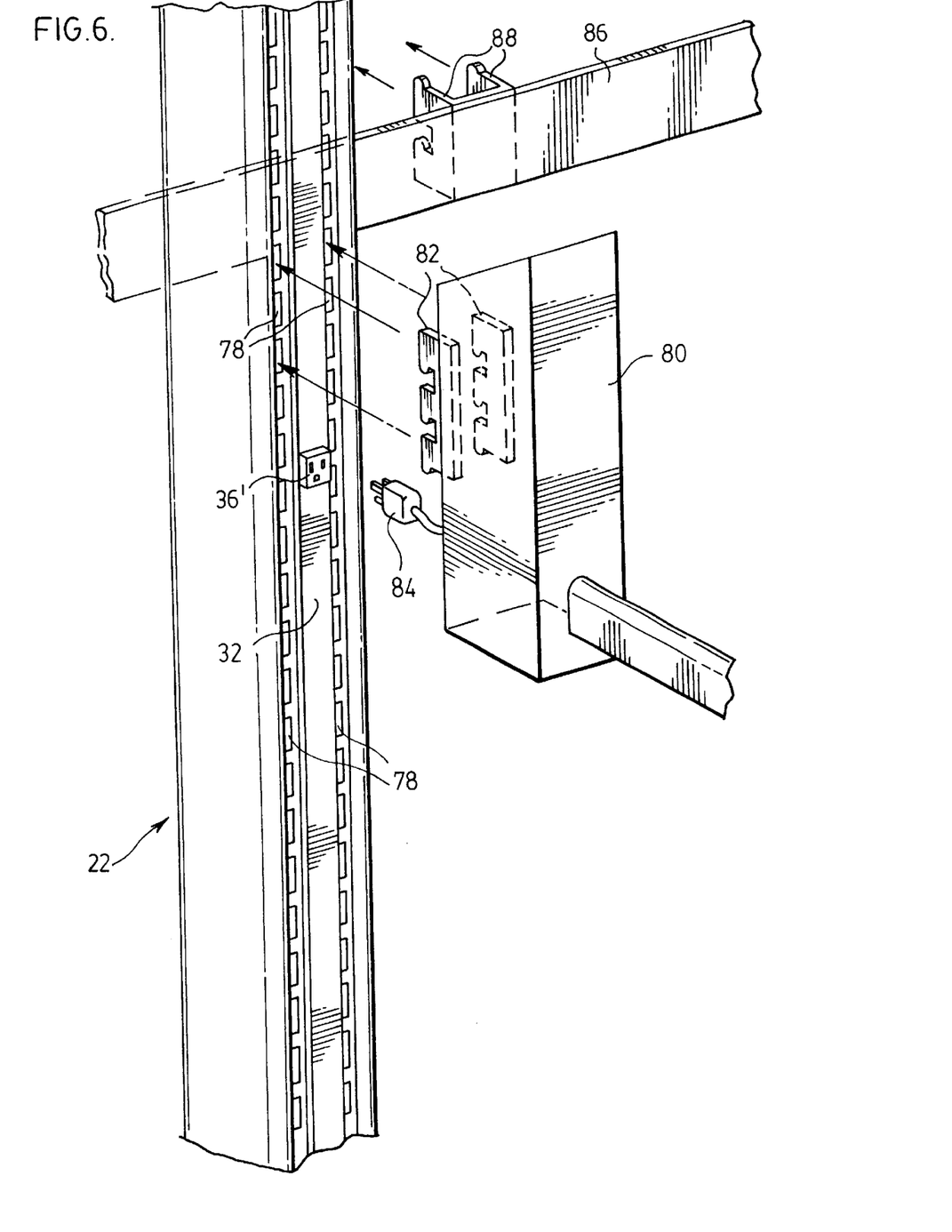
FIG. 6 is a further detail perspective view that illustrates the manner in which accessories are coupled to the column.

In the finished column, the slotted flanges 76 are visible on opposite sides of the respective flat faces 32, 34, and are accessible to serve as attachment points by which accessories can be coupled to the column. In FIG. 6, the column is shown in the same orientation as in FIGS. 1 and 2, with part of the light fixture 28 shown exploded outwardly of face 32 of the column. In this particular embodiment, the light has a fluorescent bulb and the light fixture 28 includes a box-shaped housing 80 for the ballast that is required to start the light.

Brackets 82 extend rearwardly from housing 80 and are configured with shaped "fingers" that can be hooked into the slots 78 generally in the manner of shelf supports used in some types of conventional shelving systems. As noted previously, when installed in the column, the housing 80 encloses an electrical receptacle 36' into which is inserted a plug (84) for supplying power to the light 28.

It will be appreciated that many other types of accessories can be secured to the column in similar fashion, for example, table surfaces, shelves, baskets or holders, as well as other forms of light. Since slotted flanges are provided on both sides of the column (in association with each of the flat surfaces 32, 34) there is great flexibility for providing different column configurations that include different accessories (as well as a plain column with no accessories).

As shown in FIG. 6, the slotted flanges 76 also provide attachment points for securing the upper end of the column to a T-bar ceiling structure. A transverse bar for securing the column to the ceiling structure is indicated at 86 and is provided with a pair of hooked brackets 88 similar to the brackets 82, for hooking into the slots 78. FIG. 2 shows a pair of bars 86 secured to opposite faces of the column, parallel to one another. At their ends, the bars 86 are then attached to the T-bars 90 of the ceiling structure using conventional T-bar clamping devices (not shown).

FIG. 3 shows that the bottom end of the column is secured to a floor surface by a channel-shaped bracket 92 that fits inside the closed tubular member 50 and is secured to that member by screws (not shown). In practice, the bracket 92 is first secured to a floor surface at the location at which the column itself is to be installed, for example, by suitable bolts or other anchors that extend through the base of the bracket. The column is then placed over the bracket and securing screws are inserted. The column is then appropriately oriented vertically (in both directions) and secured at its top end.

It will be recalled that FIG. 3 shows telecommunications wiring 60 extending down the column externally of the closed tubular member 50.

FIGS. 4 and 5 show respective cover members 94, 96 that are clipped to the flanges 76 of the main column extrusions 68 to enclose the wiring 60. The two cover members are in fact plastic mouldings that are convexly curved to provided an aesthetically pleasing appearance on the faces of the column that extend between the two flat faces 32, 34. Intermediate clip elements 98 are incorporated into the two cover members for actually engaging the respective flanges 76.

For applications in which there are a relatively large number of telecommunications wires, a wire management element 100 (FIGS. 4 and 5) can be provided on the respective faces 62, 64 of the closed tubular member 50 so that the wires can be retained in a relatively tidy fashion. Element 100 is a plastic extrusion having a central groove 102 that frictionally fits over a corresponding rib on the main column extrusion 68 as shown in FIG. 5. Element 100 is shaped to define spaces 104, 106 on opposite sides of groove 100 into which the wires 60 can be inserted through longitudinally extending slots 106 in the outer face of the element. The extrusion has some flexibility so that the portions of the element adjacent the slots 106 can be pulled back slightly to facilitate insertion of the wires 60. Wire management elements can of course be provided at both sides of the column, or at neither side.

In conclusion, the power column provided by the invention addresses not only the functional criteria of providing power and telecommunication services, but also provides a structural element to which accessories such as lights, tables and the like can be readily fitted (or removed) on site. At the same time, the column itself is pre-wired for ease of installation, without the need for expert electrical technicians. Finally, the column is architecturally designed to have a pleasing appearance.

It will of course be appreciated that the preceding description relates to a particular preferred embodiment of the invention only and that many modifications are possible within the scope of the invention. Some of those modifications have been indicated and others will be apparent to a person skilled in the art. The feature of an isolated electrical raceway preferably is achieved in the manner described, namely by providing lateral partitions within the existing tubular structural member of the column. However, an isolated raceway could be provided in other ways, for example, by installing a separate "box" within the column. Attachment points on the column could be provided in other ways, e.g. projecting studs on the side walls of the column onto which accessories can be hooked. Where slots are used, they may be formed directly in end faces of the column rather than in separate flanges as shown in the drawings.

We claim:

1. A power column comprising a column structure of elongate generally tubular form capable of being supported in a generally upright orientation on a floor surface, a plurality of electrical power outlets carried by the column structure and accessible from externally thereof, and electrical supply wiring extending from the electrical outlets through the column structure to an end thereof for connection to an external electrical supply, wherein the column structure defines an isolated electrical raceway that includes said electrical outlets and through which the electrical supply wiring extends to said end of the column structure, said raceway comprising a lateral wall that surrounds said electrical supply wiring, and upper and lower transverse partitions that are spaced longitudinally of the column structure and define end walls of the raceway, say wiring exending through at least one of said partitions to said end of the column structure, whereby said electrical outlets are pre-wired and can be powered after installation of the column structure by connecting the electrical supply wiring to the external eletrical supply.

2. A power column as claimed in claim 1, wherein the column structure includes a main tubular member which extendeds from end to end of the column structure and defines said lateral wall of said isolated raceway, said partitions extending transversely of the main tubular member and defining said end walls of the raceway.

3. A power column as claimed in claim 2, wherein the main tubular member has a generally rectangular cross-section defining opposite end walls that are flat and parallel to one another, and wherein said power outlets are located in at least one of said flat end walls.

4. A power column as claimed in claim 3, wherein at least one of said flat end walls of the main tubular member is provided with at least one video data module, and wherein the column structure includes communications wiring extending from said video data module to said one end of the column externally of said raceway.

5. A power column as claimed in claim 3, wherein said one end of the column structure to which said electrical supply wiring extends is an upper end of the column structure, wherein the column structure includes at least one video data module located in the said end wall of the main tubular member below the electrical raceway, wherein the column structure includes telecommunications wiring extending from said video data module to said upper end of the column externally of the raceway, said wiring being routed around the raceway through an opening in a side wall of said main tubular member that extends between said flat end walls, said wiring extending externally of said side wall, and wherein the tubular member is provided with removable cover means coupled to said side walls of the main tubular member and shaped to enclose wiring routed externally of said side walls.

6. A power column as claimed in claim 3, wherein said main tubular member includes means permitting attachment to said member of accessories to be coupled to the column structure.

7. A power column as claimed in claim 6, wherein said attachment means comprise respective series of vertically spaced slots formed in respective flanges on opposite sides of each of said flat end faces of the main tubular member, for permitting accessories to be hooked into said slots and thereby coupled to the column.

8. A power column as claimed in claim 7, further comprising a light fixture having formations engageable in said slots for coupling the light fixture to the column structure, wherein the column structure includes a said electrical receptacle into which the light fixture is plugged, and which is positioned so as to be concealed by the light fixture when installed on the column.

9. A power column as claimed in claim 8, wherein the light fixture is positioned to direct light upwardly and includes a housing that carries a reflector positioned to reflect downwardly light directed upwardly from the fixture.

10. A power column as claimed in claim 7, including a full-height column structure for extending between a floor surface and a ceiling, wherein the column structure further comprises attachment means for an upper end portion of the column structure in the form of a pair of bars extending parallel to one another across said flat end faces of the column structure, each bar including bracket means having formations engaged in said slots on opposite sides of the respective flat end faces of the main tubular member, said bars being attachable to structure within the ceiling, and at a lower end of the column structure, a bracket received within and attachable to said main tubular member and to a floor surface.

* * * * *